(No Model.)
F. R. GLASCOCK.
CULTIVATOR.
No. 443,914. Patented Dec. 30, 1890.
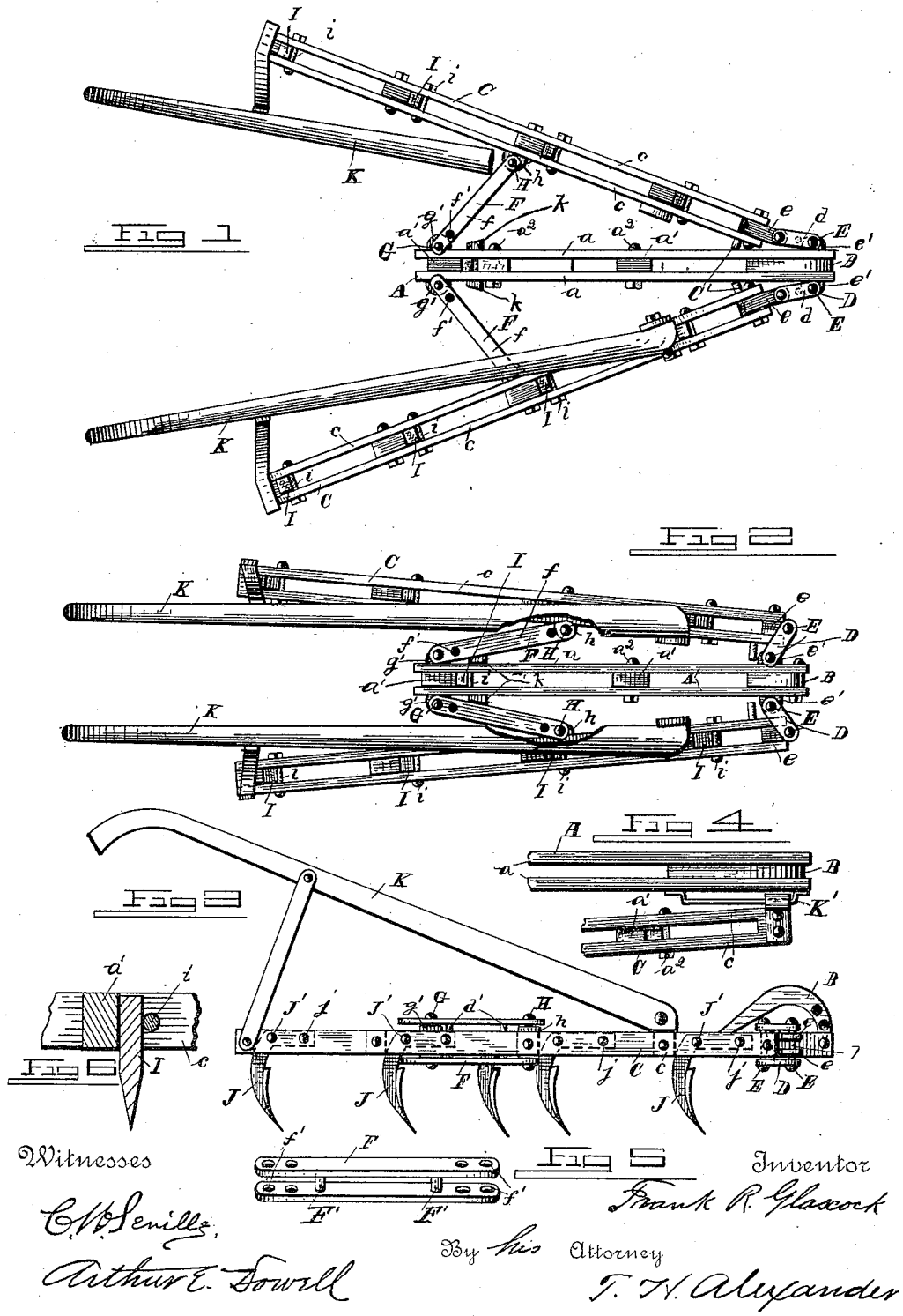
Witnesses
C. W. Seville
Arthur E. Sowell
Inventor
Frank R. Glascock
By his Attorney
T. N. Alexander

UNITED STATES PATENT OFFICE.

FRANK R. GLASCOCK, OF HILLSBOROUGH, OHIO.

CULTIVATOR.

SPECIFICATION forming part of Letters Patent No. 443,914, dated December 30, 1890.

Application filed September 27, 1890. Serial No. 366,330. (No model.)

*To all whom it may concern:*

Be it known that I, FRANK R. GLASCOCK, of Hillsborough, in the county of Highland and State of Ohio, have invented certain new and useful Improvements in Cultivators; and I do hereby declare that the following is a full, clear, and exact description thereof, reference being had to the accompanying drawings, and to the letters of reference marked thereon, which form part of this specification, in which—

Figure 1 is a top plan view of my improved harrow. Fig. 2 is a similar view of the same closed. Fig. 3 is a side elevation thereof as a cultivator. Fig. 4 is a detail plan view showing a sliding connection between the bars and beam. Fig. 5 is a detail perspective of one of the links. Fig. 6 is a detail elevation showing the attachment of harrow-teeth.

This invention is an improvement in harrows and cultivator-frames, and its object is to provide a walking cultivator or harrow which can be easily extended or closed while in use to suit the varying width between rows of corn and other vegetables in the field; and it consists in the novel construction and combination of parts hereinafter described and claimed.

Referring to the drawings by letters, A designates the center beam of the frame preferably composed of two parallel pieces *a a*, set vertically on edge and separated by narrow blocks *a'* and united by transverse bolts or rivets. Between the front end of pieces *a* is secured a clevis-iron B, as shown, to which the draft-trees can be attached.

C C designate the side bars or wings of the frame, each composed of two parallel pieces *c c* arranged edgewise, separated by blocks and united by bolts similarly to the construction of beam A.

D D designate shackles formed of short straps perforated at their ends and connected by a center-piece *d'*. The shackles are connected by bolts E to perforated ears *e* on the front ends of bars C and to ears *e'*, projecting from the sides and front end of beam A, as shown, so that a double hinge-connection is formed between the bars and beam.

C' are studs projecting from the inner side and front end of bars C and adapted to contact with the sides of beam A when the bars are thrown backward to prevent the ends of the bars contacting with the beam and throwing the shackles so far inward as to render it difficult to shift the bars.

F F are links composed of two strap-pieces *f*, united by stays F'. In the ends of these straps *f* are a series of perforations *f'*. The links are connected at one end by bolts G with ears *g g*, projecting laterally from the rear end of beam A, and their front ends are similarly connected by bolts H with ears *h*, secured about centrally to the inner side of bars C. The links project forwardly at all times, and instead of pulling or dragging bars C they thrust the same forward, while shackles D pull the same.

The bolts G and H can be engaged with different perforations *f'*, and thus regulate the width of the frame when opened.

I I designate ordinary harrow-teeth, which are secured at regular intervals to the beam and bars, as indicated. They are set up against the blocks which separate the members of the beam and bars and are clamped between the members by bolts *i i*, as indicated. This forms a simple and quick means of attaching the teeth to the frame. When used as a cultivator, irons J J, nearly C-shaped, are secured at regular intervals between the members of the beam and bars, as indicated. The irons are pivoted on transverse bolts J', and *j* are wooden break-pins thereof.

K K are the handles attached to bars C C, respectively.

In operation the machine is drawn forward by a team hitched to the front end of beam A, and the operator walks behind and regulates the positions of bars C by the handles. Owing to the manner of attachment of the bars to the beam they will be thrown outward, because the shackles and links will be swung backward, and the connection of the links and bars being considerably in advance of the connection of the links to the beam the links, as they turn on bolts G, will force the rear ends of the bars outward as the beam is drawn forward. The links being connected about centrally to the bars, however, the working-pressure against the bars is about equal in front and in rear of the links, so that the operator can easily throw either or both of the bars inward toward the beam, where the row is narrow, and upon releasing the handles the bars at once diverge.

In some cases the ends of bars C might be connected to sliding pieces K′, attached to the front end of the beam, such as indicated in Fig. 4; but I prefer shackles.

k k are pieces attached to beam A in position to stop the inward movement of the rear ends of the bars, so that the points of attachment of the links to the bars will not pass a line drawn between the front connection of the bars and beam and the links and beam.

Having described my invention, I claim—

1. The combination of a central beam, opposite movable side bars connected to the front ends of the beam by shifting or self-adjustable connections, with the forwardly-inclined links connected by their rear ends to the rear end of the beam and by their front ends to the side bars at points about centrally of the latter, and the handles attached to said bars, all substantially as specified.

2. The combination of the central beam and side bars and the harrow-teeth secured between the members of the beam and bars, said bars being indirectly connected at their front ends to the front end of the beam, the forwardly-inclined links connected at their rear ends to ears projecting from the rear end of the beam and at their front ends to ears projecting laterally and about centrally from the bars, the handles attached to said bars, and the studs and pieces to limit the inward movement of the bars, all substantially as specified.

In testimony that I claim the foregoing as my own I affix my signature in presence of two witnesses.

FRANK R. GLASCOCK.

Witnesses:
T. H. ALEXANDER,
DANIEL MCCARTHY.